(12) United States Patent
Ramanzin

(10) Patent No.: US 7,944,966 B2
(45) Date of Patent: May 17, 2011

(54) VIDEO DECODING METHOD AND CORRESPONDING DECODER

(75) Inventor: Yves Ramanzin, Paris (FR)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 2429 days.

(21) Appl. No.: 09/989,248

(22) Filed: Nov. 20, 2001

(65) Prior Publication Data

US 2002/0071492 A1    Jun. 13, 2002

(30) Foreign Application Priority Data

Nov. 23, 2000  (EP) .................................... 00403281
Oct. 2, 2001  (EP) .................................... 01402546

(51) Int. Cl.
    *H04B 1/66* (2006.01)
(52) U.S. Cl. ................................................ 375/240.01
(58) Field of Classification Search .............. 375/240.1, 375/240.11; 348/397.1, 398.1; 382/240, 382/243
    See application file for complete search history.

(56) References Cited

U.S. PATENT DOCUMENTS

| 5,742,343 A | 4/1998 | Haskell et al. |
| 5,973,739 A * | 10/1999 | Nilsson ...................... 375/240.1 |
| 6,011,872 A | 1/2000 | Qian et al. |
| 6,057,884 A | 5/2000 | Chen et al. |
| 6,148,030 A | 11/2000 | Katata et al. |
| 6,233,356 B1 | 5/2001 | Haskell et al. |
| 6,377,622 B1 * | 4/2002 | Kim et al. ...................... 375/240 |
| 6,535,558 B1 | 3/2003 | Suzuki et al. |
| 6,700,933 B1 * | 3/2004 | Wu et al. ................... 375/240.16 |
| 2002/0037048 A1 * | 3/2002 | Van Der Schaar et al. ....................... 375/240.12 |

FOREIGN PATENT DOCUMENTS

| JP | 07-170514 | 7/1995 |
| JP | 08-018958 | 1/1996 |
| JP | 09-037260 | 7/1997 |
| JP | 10-294943 | 4/1998 |
| JP | 10-271512 | 10/1998 |
| JP | 2000-041257 | 8/2000 |
| WO | WO 97/01934 | 1/1997 |
| WO | WO 99/33274 | 7/1999 |
| WO | WO 01/47274 | 6/2001 |

OTHER PUBLICATIONS

James K. Han and George C. Pollynos. Multi-resolution Layered Coding for Real-Time Image Transmission: Architectural and Error Control Considerations. Aug. 1998. vol. 4, Issue 4. pp. 275-298.*

(Continued)

*Primary Examiner* — Tung Vo
(74) *Attorney, Agent, or Firm* — DLA Piper LLP (US)

(57) ABSTRACT

The invention relates to a method of decoding a video bitstream including base layer and enhancement layer coded video signals, the method comprising the steps of decoding the base layer and enhancement layer coded video signals to produce decoded base layer frames and decoded enhancement layer frames, and displaying the decoded base layer frames either alone or with the decoded enhancement layer frames. According to the invention, each poor quality frame of the base layer to be displayed is replaced by an frame obtained either by means of an interpolation between the two frames of the enhancement layer preceding and following the poor quality frame of the base layer or by only one of these two frames, for example the temporally closest one.

4 Claims, 1 Drawing Sheet

OTHER PUBLICATIONS

Figure 1:
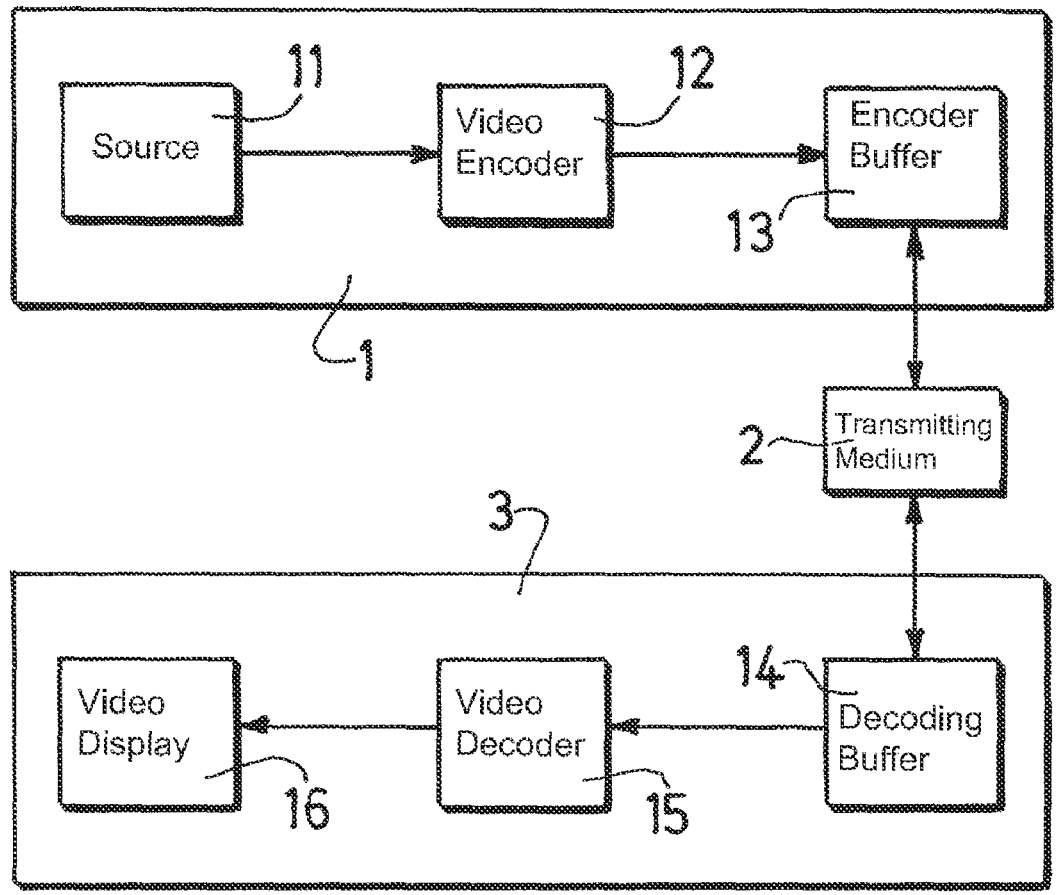

Abstract of JP 07-170514, publication date Jul. 4, 1995, espacenet.com, Nov. 29, 2010, pp. 1.

Abstract of JP 10-271512, publication date Oct. 9, 1998, espacenet.com, Nov. 29, 2010, pp. 1.

Koenen, R., "Overview of the MPEG-4 Version 1 Standard", International Organization for Standardization—Organisation Internationale de Normalization, ISO/IEC JTC1/SC29/WG11 N1909, Oct. 1991, pp. 1-28.

Fukunaga, S. et al., "MPEG-4 Video Verification Model Version 16.0", International Organization for Standardization—Organisation Internationale de Normalization, XX, XX, vol. N3312, Mar. 2000, XP000861688, pp. 1-90.

Information Technology—Coding of Audio-Visual Objects—Part 2: Visual, International Organisation For standardization Organisation Internationale De Normalisation, ISO/IEC JTC 1/SC 29/WG 11 N 3056, Jan. 31, 2000, 7 pages.

Dudon, Marie et al., "Motion Estimation And Triangular Active Mesh", Revue HF, 1995, vol. 4, pp. 47-53.

Fleury, Pascal et al., "MPEG-4 Video Verification Model: A Solution For Interactive Multimedia Applications", Journal of Electronic Imaging, Jul. 1998, vol. 7(3), pp. 502-515.

Radha, H., et al., "Scalable Internet Video Using MPEG-4", Signal Processing: Image Communication, Elseview Science Publishers, Amsterdam, NL, vol. 15, No. 1-2, Sep. 1999, pp. 95-126, XP 004180640, ISSN: 0923-5965.

Li, Weiping, "Overview of Fine Granularity Scalability in MPEG-4 Video Standard", IEEE Transaction On Circuits And Systems For Video Technology, vol. 11, No. 3, Mar. 2001, pp. 301-317.

* cited by examiner

VIDEO DECODING METHOD AND CORRESPONDING DECODER

RELATED APPLICATIONS

This application claims the priority benefits of European Application No. 00403281.9, filed Nov. 23, 2000, and European Application 01402546.4 filed Oct. 2, 2001.

The present invention generally relates to video decompression, and more particularly to a decoding method for decoding a video bitstream including base layer coded video signals and enhancement layer coded video signals and generating decoded signals corresponding either only to the base layer signals, to be then displayed alone, or to the base layer signals and the enhancement layer signals, to be then displayed together. It also relates to a corresponding video decoder.

In an encoder according to the MPEG-4 standard (said standard being described for instance in the document "Overview of the MPEG-4 Version 1 Standard", ISO/IEC JTC1/SC29/WG11 N1909, October 1997, Fribourg), three types of pictures are used: intra-coded (I) pictures, coded independently from other pictures, predictively-coded (P) pictures, predicted from a past reference picture (I or P) by motion compensated prediction, and bidirectionally predictively-coded (B) pictures, predicted from a past and a future reference picture (I or P). The I pictures are the most important, since they are reference pictures and can provide access points (in the bitstream) where decoding can begin without any reference to previous pictures (in such pictures, only the spatial redundancy is eliminated). By reducing both spatial and temporal redundancy, P-pictures offer a better compression compared to I-pictures which reduce only the spatial redundancy. B-pictures offer the highest degree of compression.

In MPEG-4, several structures are used, for example the video objects (VOs), which are entities that a user is allowed to access and manipulate, and the video object planes (VOPs), which are instances of a video object at a given time. In an encoded bitstream, different types of VOPs can be found: intra coded VOPs, using only spatial redundancy (the most expensive in terms of bits), predictive coded VOPs, using motion estimation and compensation from a past reference VOP, and bidirectionally predictive coded VOPs, using motion estimation and compensation from past and future reference VOPs.

For P-VOPs and B-VOPs, only the difference between the current VOP and its reference VOP(s) is coded. Only P- and B-VOPs are concerned by the motion estimation, carried out according to the so-called "Block Matching Algorithm": for each macroblock of the current frame, the macroblock which matches the best in the reference VOP is sought in a one layer. In the case of temporal scalability, at least two layers consisting of a lower layer and a higher layer are considered. The lower layer is referred to as the base layer, encoded at a given frame rate, and the additional layer is called the enhancement layer, encoded to provide the information missing in the base layer (in order to form a video signal with a higher frame rate, as described for instance in FIG. 4 of the document "Overview of fine granularity scalability in MPEG-4 video standard", W. Li, IEEE Transactions on Circuits and Systems for Video Technology, vol. 11, n°3, March 2001) and thus to provide a higher temporal resolution at the display side. A decoder may decode only the base layer, which corresponds to the minimum amount of data required to decode the video stream, or also decode the enhancement layer (in addition to the base layer), said enhancement layer corresponding to the additional data required to provide, if associated to the data corresponding to the base layer, an enhanced video signal, and then output more frames per second if a higher resolution is required.

However, at the decoding side, there are situations where a large difference of quality between the displayed images of the base layer and those of the enhancement layer is observed, for example when the available bandwidth for each layer is very different. In that case, the subjective quality of the decoded sequence can be quite low because of the flickering effect, even if only a few frames (those of the base layer) have a significantly lower quality, compared with the average of the sequence.

It is therefore the object of the invention to propose a video decoding method allowing to improve the quality of the displayed decoded sequence.

To this end the invention relates to a decoding method such as defined in the introductory paragraph of the description and comprising the steps of:

decoding the base layer coded video signals to produce decoded base layer frames;
  decoding the enhancement layer coded video signals to produce decoded enhancement layer frames;
  displaying the decoded base layer frames either alone or with the decoded enhancement layer frames to form video frames; said method being characterized in that the displaying step itself comprises:
  a decision sub-step, for examining on the basis of a given criterion the quality of each successive base layer frame to be displayed and selecting the poor quality frames;
  a replacement sub-step, for replacing each poor quality base layer frame by at least one of the two frames of the enhancement layer preceding and following said poor quality frame base layer frame.

The invention will now be described in a more detailed manner, with reference to the accompanying drawing in which FIG. 1 shows the general implementation of a system for coding and decoding a video sequence.

A system for coding and decoding a video sequence is generally implemented as shown in FIG. 1. Said system comprises a video encoding part 1, a video decoding part 3 and, between them, a transmitting medium 2. The encoding part 1 comprises a video frame source 11 generating uncompressed video frames, a video encoder 12 provided for coding the frames it receives from the source 11, and an encoder buffer 13. In the encoder 12, the uncompressed video frames entering at a given frame rate are coded according to the principles of the MPEG-4 standard and transmitted to the encoder buffer 13 at the output of which the stored, coded frames are sent towards the transmitting medium 2.

At the decoding side, the transmitted coded frames are received by the video decoding part 3 which comprises a decoder buffer 14, a video decoder 15 and a video display 16. The decoder buffer 14 receives and stores the transmitted, coded frames and itself transmits them to the video decoder 15 which decodes these frames, generally at the same frame rate. The decoded frames are then sent to the video display 16 which displays them.

In the present case of a scalable coding scheme, the video encoder 12 comprises a base layer encoding stage, which receives from the source 11 the frames corresponding to the original video signal and codes the frames for generating a base layer bitstream sent to the encoder buffer 13, and an enhancement layer encoding stage, which receives on the one hand (from the source 11) the frames corresponding to the original video signal and on the other hand decoded frames derived from the coded frames transmitted in the base layer bitstream. This enhancement layer encoding stage generates, in the form of an enhancement layer coded bitstream, a residual signal that represents the image information missing in the base layer frames and may therefore be added to the base layer bitstream.

Reciprocally, on the decoding side, the decoder 15 of the video decoding part 3 comprises processing circuitry provided for receiving the coded base layer bitstream and the coded enhancement layer bitstream and sending towards the video display 16 decoded signals corresponding either to the base layer signals, then displayed alone, or to the base layer signals associated with the enhancement layer signals, displayed together.

Under some conditions, and for instance when the available bandwidth for each layer is very different, a very large difference of quality between the displayed images coming from the base layer and the displayed images coming from the enhancement layer is observed. In such a situation, the subjective quality of the displayed, decoded sequence will be low, owing to a flickering effect, even if only a few frames in the base layer have a significantly lower quality compared with the average quality of the sequence. This drawback may be avoided if said poor quality frames of the base layer are not displayed and are replaced by frames coming from the enhancement layer.

These replacement frames may be for example frames interpolated from the preceding and following frames of the enhancement layer. The replacement frame may also be obtained by copying one of said preceding and following frames, for instance the temporally closest one.

For deciding whether the decoded frames have a sufficient quality to be displayed, a quantitative criterion has to be defined. It is for instance possible to store and compare the quantization step sizes of the successive frames: in case of a very noticeable difference of said step size for a frame with respect to the other preceding and following frames, it is likely that said frame has a poor quality. Another criterion may be the following. Each frame being divided into 8×8 blocks, the texture gradient at the boundaries of said blocks is examined: if said gradient is noticeably higher in a specific base layer frame, said frame is considered as having a poor quality and is not displayed.

It must be understood that the video decoder described hereinabove can be implemented in hardware or software, or by means of a combination of hardware and software. It may then be implemented by any type of computer system or other apparatus adapted for carrying out the described method, comprising for instance a memory which stores computer-executable process steps and a processor which executes the process steps stored in the memory so as to produce the decoded frames to be displayed. A typical combination of hardware and software could be a general-purpose computer system with a computer program that, when loaded and executed, controls the computer system such that it carries out the method described herein. Alternatively, a specific use computer, containing specialized hardware for carrying out one or more of the functional tasks of the invention, could be utilized. The present invention can also be embedded in a computer program medium or product, which comprises all the features enabling the implementation of the method and functions described herein, and which—when loaded in a computer system—is able to carry out these method and functions. The invention also relates to the computer executable process steps stored on such a computer readable medium or product and provided for carrying out the described video decoding method. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation, and/or (b) reproduction in a different material form.

The foregoing description of the invention has been presented for purposes of illustration and description, and is not intended to be exhaustive or to limit the invention to the precise form disclosed, and variations are possible in light of the above teachings. Such variations that are apparent to a person skilled in the art are intended to be included within the scope of this invention.

The invention claimed is:

1. For use in a video decoder comprising processing circuitry capable of receiving from a transmitting and/or storing medium a video bitstream which itself includes base layer coded video signals and enhancement layer coded video signals and decoding said bitstream for generating decoded signals corresponding either only to the base layer signals, to be then displayed alone, or to the base layer signals and the enhancement layer signals, to be then displayed together, a method of decoding said video bitstream including said base layer and enhancement layer coded video signals, comprising the steps of:
   decoding the base layer coded video signals to produce decoded base layer frames;
   decoding the enhancement layer coded video signals to produce decoded enhancement layer frames;
   displaying the decoded base layer frames either alone or with the decoded enhancement layer frames to form video frames;
said method being characterized in that the displaying step itself comprises:
   a decision sub-step, for examining on the basis of a given criterion the quality of each successive base layer frame to be displayed and selecting the poor quality frames;
   a replacement sub-step, for replacing each poor quality base layer frame by at least one of the two frames of the enhancement layer preceding and following said poor quality frame base layer frame.

2. A decoding method according to claim 1, in which each poor quality base layer frame is replaced by the temporally closest of said preceding and following frames of the enhancement layer.

3. A decoding method according to claim 1, in which said poor quality base layer frame is replaced by a frame obtained by means of an interpolation between said preceding and following frames of the enhancement layer.

4. A video decoder for decoding a video bitstream including base layer coded video signals and enhancement layer coded video signals, wherein the enhancement layer includes enhancement frames arranged in a display order, said decoder comprising:
   first decoding means for producing decoded base layer frames;
   second decoding means for producing decoded enhancement layer frames;
   displaying means for displaying said decoded base layer and enhancement layer frames and in which each poor quality frame of the base layer to be displayed is replaced by an frame obtained either by means of an interpolation between the two frames of the enhancement layer preceding and following said poor quality frame of the base layer or by only one of these two frames.

* * * * *